Patented Nov. 5, 1929

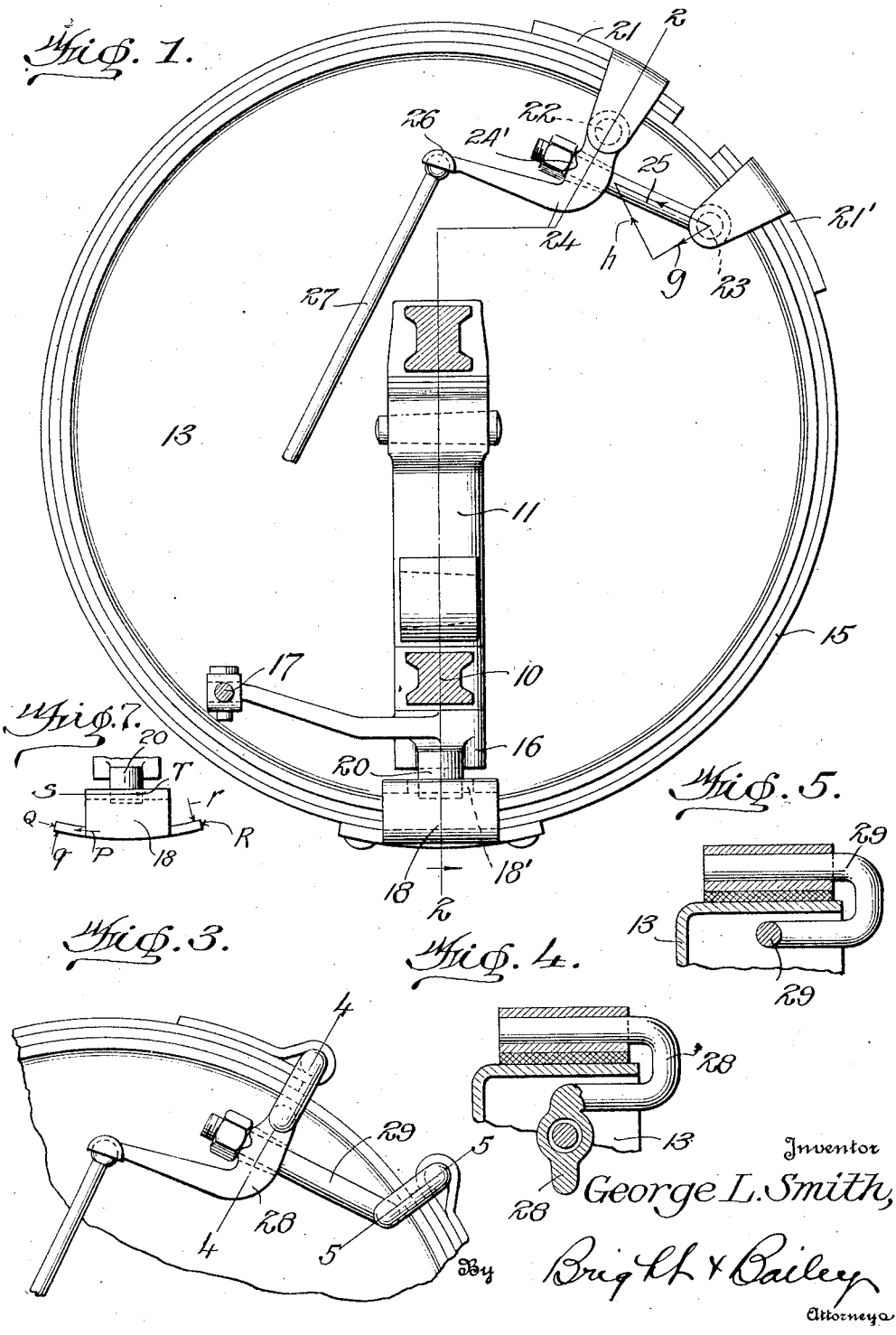

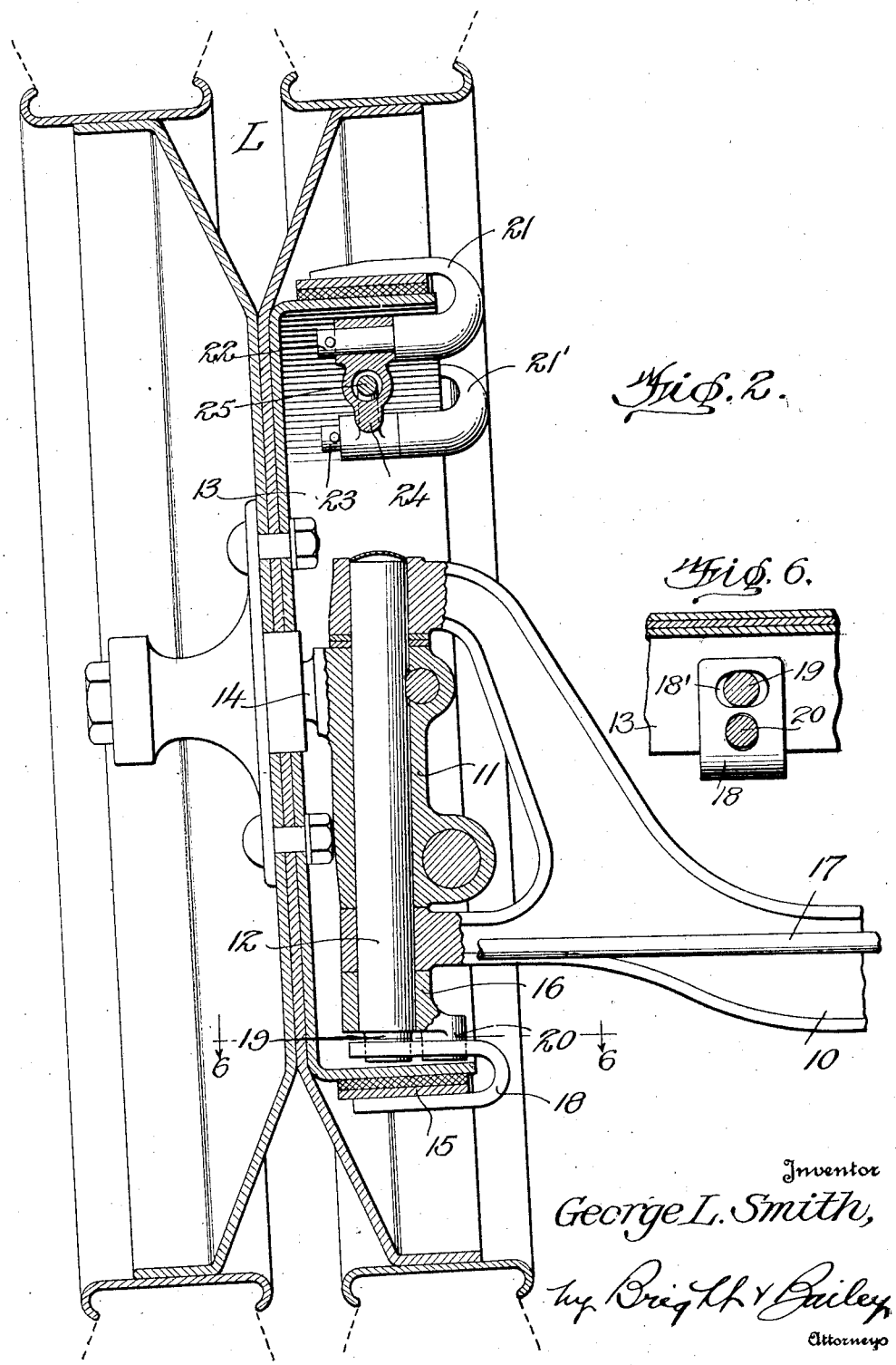

1,734,535

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

FRICTION BRAKE FOR AUTOMOTIVE VEHICLES

Application filed December 18, 1925. Serial No. 76,223.

My invention relates to friction brakes for automotive vehicles.

It is the purpose of my present invention to enhance the efficiency of automotive vehicle brakes of the external contracting band type by embodying therein a novel and improved construction of band anchorage and a novel construction and arrangement of band contracting mechanism, through the instrumentality of which I am enabled to attain more effective braking action upon contraction of the band than can be produced by prior analogous structures.

In addition I improve the appearance of an external type of brake band by eliminating to a great extent protruding levers, anchors, etc. which in my design are located inside the brake drum.

It is also a further purpose of my invention to provide a brake structure wherein all brake parts are located so that they will not interfere with balloon tire equipment or double tire rims of any type.

I will describe my invention in the best form known to me at present, but it will be understood that the same is susceptible to changes in form and proportion and to desirable mechanical additions without departing from the scope thereof as set forth in the appended claims.

In the drawings chosen to illustrate my invention:—

Figure 1 is a side elevation of a left front wheel brake for a motor vehicle looking at the inner side of said brake;

Figure 2, a section on the line 2—2 of Figure 1;

Figure 3, a side elevation of a modified form of toggle mechanism;

Figure 4, a section on the line 4—4 of Figure 3;

Figure 5, a section on the line 5—5 of Figure 3;

Fig. 6, a section on the line 6—6 of Fig. 2 and

Fig. 7 is a detail view illustrative of the coaction between my improved anchor and brake setting mechanism.

Referring to the drawing and particularly Figures 1 and 2 the numeral 10 represents the front axle, 11 the steering knuckle, 12 the king pin and 13 the brake drum secured to the wheel L which is mounted on the spindle 14 all in the usual manner.

A brake band surrounds the drum 13. I anchor this band to the king pin 12 at a point located inside the drum by a U-shape bracket or pad 18 which is secured to the band 15 and has a slot 18′ in its upper flange receiving the lower end 19 of the king pin, said slot being of sufficient length transversely of the pad 18 to permit limited rotation of the band. The novelty of this construction resides in connecting an external brake band to an anchor at a point located within the brake drum whereby the band contracting force, when applied, will react from a point within the drum with resultant increased braking efficiency of the band adjacent the anchorage. A bearing in the upper flange of the pad 18 receives a crank pin 20 of a bell crank 16 and this bell crank is connected by an equalizer rod 17 to a corresponding bell crank (not shown) on the right side. This arrangement of interconnected bell cranks is similar to that shown in my prior Patents 1,440,842 of January 2, 1923 and 1,490,642 of April 15, 1924, but is in no way essential to my present invention and is illustrated simply for the purpose of showing one manner of associating such invention with the equalizer mechanism of my prior patents wherein rotation of the band is required and explains the necessity of permitting limited band rotating movement of the pad 18 in the particular embodiment of my invention herein illustrated.

For the brake setting mechanism I show two pads 21 and 21′ secured to the ends of the brake band which extend around and inside of the drum flange and terminate in two pivots 22 and 23. These pivots are connected by toggle mechanism formed of a lever 24 and a link 25 which coact to provide a fulcrum 24′ located within the drum. The head of lever 24 is positioned over the head of the king pin 12 as at 26 and is operated by a push rod 27, so that any turning movement of the wheel on the king pin will not affect the application of the brake. It will be obvious from this construction that upon operation of the brake setting mechanism contracting forces having components tangential and radially inward of the drum will be applied to the reverse or unwrapping end of the band, the advantage of which is hereinafter more fully referred to, such radial and tangential components being indicated at $g$ and $h$ respectively in Figure 1.

It will be understood that the toggle mechanism previously described can be varied in many ways such as that shown in Figures 3, 4 and 5 where the lever 28 and link 29 are bent around the drum flange and pivot directly to the brake band ends.

It will be apparent from the foregoing description in connection with accompanying drawings that by connecting the brake band to its anchorage at a point located within the periphery of the brake drum, I obtain, upon application of the band, reaction from a point inside the periphery of the drum which obviously increases the pressure of the band adjacent the anchorage and thus develops more braking power for the same pedal pressure than can be obtained by brake structures wherein the point at which the external brake band is connected to its anchorage is located outside the periphery of the drum.

It will also be apparent that my brake band contracting mechanism is pointedly distinct and advantageous over known arangements and constructions of brake contracting mechanisms, in that it consists of a contracting toggle in which the band contracting force applied to the reverse or upwrapping end of the band has components not only tangential, but also radially inward of the drum. This inward radial component holds the reverse end in against the drum and therefore obviously produces greater brake force for the same pedal pressure than can be obtained in analogous known constructions in which the band contracting force of the mechanism applied to the reverse or unwrapping end of the band has components tangential and radially outward of the drum.

Furthermore, my improved brake contracting mechanism is additionally advantageous over known analogous structures because of the fact that heretofore the pressure of the reverse or unwrapping end of the band has been lower than that of the wrapping end and this has resulted in more rapid wear of the wrapping end of the band. By my improved contracting mechanism it will be obvious that the pressure of the unwrapping end of the band is raised into more nearly substantial equality with the pressure of the wrapping end, due to the application of contracting forces thereto which have components tangential and radially inward of the drum, with the result that the brake lining wears down more evenly and is more nearly used up throughout the length of the band when it becomes necessary to reline the same.

It is also important to note that an advantageous coaction exists between my improved anchor and the brake setting mechanism and that such coaction serves to increase the band pressure on the drum at two approximately diametrically opposite points on the "go ahead" side of the brake band; that due to the anchor is a local increase, and that due to the brake setting mechanism, while local in character, sets up an increase from the band end on the "go ahead" side of the band to the anchor which is progressive in extent and which includes the point where pressure increase is produced by the anchorage connection. Thus the anchor and the brake setting mechanism act together to build up a braking pressure on the "go ahead" side of the band greater than would be the case if the anchor were combined with an ordinary conventional design of brake setting mechanism, or the brake setting mechanism combined with an ordinary conventional design of anchor. However, it should be understood that the advantage gained by the coaction of my specific anchor and specific brake setting mechanism is present, but in a lesser degree, when my anchor is used in connection with a conventional brake setting mechanism and when my brake setting mechanism is used with a conventional anchor.

The coaction between my anchor and brake setting mechanism may be better understood by reference to Figure 1 and Figure 7, the latter of which shows the pad 18 and anchor pin 20, the brake band being omitted. Were a force to be exerted on pad 18 in the direction of the arrow P, the anchor pin 20 would resist this force in the direction shown by the arrow S, and were the pad 18 free to rotate about the point T, the end Q would swing in the direction of the arrow $q$ and the end R would swing down in the direction of the arrow $r$. But this movement is prevented by the brake drum, brake lining and brake band so that the tendency of the force at Q is to increase the brake pressure at this point. It might be inferred on the other hand that tendency of the brake band to pull away at the end R would neutralize the increase in the pressure of the brake band at Q and produce no net increase of the brake pressure, but it will be seen that an increase of pressure at the point Q, which is the "go ahead" side of the brake band, increases the brake force, while a reduction of pressure at point R, which is on the backing or unwrapping side of the band does not decrease the braking force of that side since such force is measured by the tension in the link 25 and therefore depends upon the thrust of the push rod 27 which in turn depends upon the brake setting force applied, and is therefore independent of variations in pressure at the point R.

I claim:

1. In a brake mechanism, a brake drum, a brake band anchoring element, an external contracting brake band having connection with said element at a point located within the periphery and between the ends of the drum, and mechanism for contracting the band operable to apply forces having components radially inward of the drum.

2. In a brake mechanism, a brake drum, a brake band anchoring element, and an external contracting brake band having connection with said element at a point located within the periphery and between the ends of the drum.

3. In a brake mechanism, a brake drum, a brake band anchoring element, an external contracting brake band, and a pad secured to said brake band and having connection with the anchoring element at a point located within the periphery and between the ends of the drum.

4. In a brake mechanism, a brake drum, a brake band surrounding said drum, a brake anchor, and an element connected to said band and movably connected to said anchor at a point inside of and between the ends of the drum.

5. In a brake mechanism, a brake drum, an external contracting brake band surrounding the drum, and mechanism for contracting the band operable to apply a contracting force to the band directed through the braking surface of the drum and through a point within the length of the band spaced from the end thereof.

6. In a brake mechanism, a brake drum, an external contracting brake band surrounding the drum, and a brake contracting mechanism connecting the ends of the band, said mechanism having a fulcrum located within the cylinder which includes the periphery of the drum and toward which fulcrum the contracting force exerted by the mechanism on one end of the band is directed.

7. In a brake mechanism, a brake drum, an external contracting brake band surrounding the drum, and mechanism for contracting the band inclusive of a tension member located within the drum and effective to apply a contracting force to the band directed through the braking surface of the drum and through a point within the length of the band spaced from the end thereof.

8. In a brake mechanism, a brake drum, an external contracting brake band surrounding the drum, and mechanism for contracting the band inclusive of a tension member extending within the drum and effective to apply a contracting force to the band directed through the braking surface of the drum and through a point within the length of the band spaced from the end thereof.

9. In a brake mechanism, a brake drum, an external contracting brake band surrounding the drum, a lever connected at one end with one end portion of the band, means to apply force to the other end of said lever, and a tension member connecting said lever at a point intermediate its ends with the other end portion of said band, the point of connection between said lever and said tension member being located within the drum.

In testimony whereof I hereunto affix my signature.

GEORGE L. SMITH.